United States Patent [19]

Hyatt

[11] Patent Number: 4,722,774

[45] Date of Patent: Feb. 2, 1988

[54] RECOVERY OR ARSENIC AND ANTIMONY FROM SPENT ANTIMONY CATALYST

[75] Inventor: David E. Hyatt, Northglenn, Colo.

[73] Assignee: Chemical & Metal Industries, Inc., Denver, Colo.

[21] Appl. No.: 18,415

[22] Filed: Feb. 25, 1987

[51] Int. Cl.$^4$ ............................................. C01B 29/00
[52] U.S. Cl. .................................... 204/123; 75/109; 75/121; 423/87; 423/491; 423/617
[58] Field of Search ......................................... 204/123

[56] References Cited

U.S. PATENT DOCUMENTS

| | | | |
|---|---|---|---|
| 2,605,211 | 7/1952 | Deters | 423/87 |
| 3,760,059 | 9/1973 | Ertel et al. | 423/87 |
| 3,784,671 | 1/1974 | Joerchel et al. | 423/87 |
| 3,806,589 | 4/1974 | Becher et al. | 423/87 |
| 3,872,210 | 3/1975 | Ukaji et al. | 423/87 |
| 4,005,176 | 1/1977 | Fernschild et al. | 423/87 |
| 4,411,874 | 10/1983 | Lee | 423/87 |

Primary Examiner—John Doll
Assistant Examiner—Wayne A. Langel
Attorney, Agent, or Firm—Burns, Doane, Swecker & Mathis

[57] ABSTRACT

Antimony, or antimony and arsenic, are recovered from a halocarbon-containing spent antimony pentachloride catalyst, such as a catalyst used in the manufacture of fluorocarbons, in a manner that produces a substantially nontoxic waste product that is environmentally acceptable for disposal in a landfill. In the process, the antimony pentachloride in the spent catalyst is reduced to antimony trichloride, which is extracted from the reduced agent catalyst by means of an aqueous acid, arsenic trichloride which is commonly also present in such spent catalyst is extracted at the same time, the aqueous extract is separated from an organic phase which can be disposed of by incineration, the metal values are removed from the aqueous extract by further reduction and separation of, and the residual aqueous acid phase is neutralized and solidified by the addition of lime or other environmentally acceptable base.

16 Claims, 5 Drawing Figures

Flowsheet for Processing of Spent Antimony Fluorocarbon Catalyst

RECOVERY OR ARSENIC AND ANTIMONY FROM SPENT ANTIMONY CATALYST

This invention was made with Government support under Contract No. 68-02-4153 awarded by the U.S. Environmental Protection Agency. The Government has certain rights in this invention.

TECHNICAL FIELD

This invention relates to the recovery of antimony from spent antimony pentachloride catalyst such as that used in the preparation of fluorocarbons. More particularly, the invention relates to the recovery of arsenic and antimony from the spent catalyst as well as allowing disposal of the remaining spent catalyst components in an environmentally acceptable manner. Advantageously, a clean organic phase containing organic halides is separated from the catalyst and may be disposed of by incineration. The aqueous effluents from this spent catalyst recovery process may be readily solidified to produce a nonhazardous solid waste for disposal.

BACKGROUND OF THE INVENTION

Some 255 million to 275 million metric tons of regulated hazardous waste is reportedly being generated annually in the United States and as much as 80 percent of this regulated hazardous waste is being disposed of in landfills. Additional millions of tons of hazardous waste are probably being disposed of in sanitary landfills by manufacturers who produce less than one metric ton of waste a month and who therefore are exempt from federal regulation.

Much of this landfilled waste will remain hazardous for years or even centuries since landfilling is primarily a containment, not a treatment or detoxification process. At the very least, proper landfill disposal requires accurate record-keeping, increased insurance and trust arrangements, closure and post closure plans, surface and sub-surface monitoring, and caretaking arrangements, perhaps into eternity. Inappropriate disposal of hazardous waste on land creates the risk of contaminating the environment, particularly ground water.

In 1984 a set of far-reaching amendments to the Resource Conservation and Recovery Act of 1976 was enacted in response to both the magnitude and the urgency of the waste disposal problem. Congress has banned land disposal of all hazardous wastes over the ensuing five years. To comply with this new legislation, two major alternatives present themselves: (1) recycle or recovery and reuse and (2) incineration. Recycle or recovery and reuse have the advantage of retrieving value out of the waste. Incineration has the somewhat neutral, but highly desirable attribute of ultimate destruction (except for gaseous products, ash, slag, etc.). The Environmental Protection Agency has undertaken to identify suitable alternatives to land disposal, including treatment, recycling, waste reduction technologies, and long-term storage, with particular emphasis on recycle and treatment of toxic wastes. The landfilling of heavy metals (e.g., arsenic and antimony) and other toxic materials such as polychlorinated biphenyls, dioxin and other halogenated organics will be severely restricted or eliminated.

In some cases otherwise desirable methods of recovery (e.g., distillation for separation and recovery of halocarbons) or incineration cannot be used because of the corrosive and/or highly acidic nature of the waste stream. The spent catalyst from fluorocarbon manufacturing processes is an example of such a waste stream. This catalyst stream may be targeted early by the new legislation since current disposal technology is inadequate. Halocarbon streams from chlorocarbon and fluorocarbon manufacturing processes often contain acidic by-products (e.g., HF and HCl) and heavy metals that either are added as catalysts (e.g., antimony chloride catalysts in fluorocarbon production) or enter the process along with reactants. Arsenic, for instance, is a common impurity in hydrogen fluoride used in fluorocarbon production. However, although present in very small concentrations, arsenic is concentrated as arsenic trichloride in the reactor mass because of the tremendous volume of hydrogen fluoride used.

The acidic and corrosive nature of organic by-product and waste streams from fluorocarbon manufacturing processes plus the presence of heavy metals makes them unsuitable for separation and recovery by distillation. The presence of hydrogen chloride, hydrogen fluoride, and arsenic trichloride results in a multitude of azeotropic combinations that make separation and recovery of useful halocarbons from such spent catalyst by simple or direct distillation impossible. The presence of arsenic trichloride also makes direct incineration impractical since volatile arsenic and antimony chlorides contaminate the solutions used to scrub acids (e.g., HCl and HF) from the incinerator flue gases. Furthermore, inorganic and organic fluorides attack the incinerator firebrick, decreasing the life of the incinerator lining.

Spent antimony catalyst from fluorocarbon manufacturing processes is an extremely hazardous, toxic, and corrosive waste stream, but one with a high potential for the recovery of valuable recyclable and reusable chemicals. Antimony pentachloride is the major catalyst for fluorocarbon production from chlorocarbons. The most common chlorocarbon feedstocks for these reactions are carbon tetrachloride,

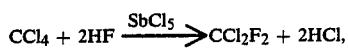

and chloroform,

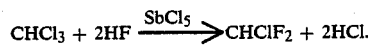

In the manufacturing process the reactants, for example, carbon tetrachloride and hydrogen fluoride, are bubbled through antimony pentachloride, a liquid, usually in a steel jacketed reactor. The products are removed continuously as volatile organics. The antimony pentachloride catalyst is not susceptible to catalyst poisoning, destruction, or even to serious processing losses. Instead, its activity is generally reduced in the system through simple dilution by by-products (e.g., tetrachloroethane) or by impurities in the feedstocks (e.g., methylene chloride in the chloroform feed and arsenic in the hydrogen fluoride feed). When the catalyst activity has been reduced below a practical level, the reactor mass is dumped and replaced by fresh, undiluted antimony pentachloride. The major components of the spent catalyst from fluorocarbon manufacturing are typically:

| Antimony chlorides | 35–45% |

-continued

| | |
|---|---|
| Arsenic trichloride | 5–10% |
| Chloroform or carbon tetrachloride | 20–30% |
| 1,1,2,2, tetrachloroethane | 10–20% |
| Other halocarbons, e.g., chlorofluorocarbons | 5–10% |
| Hydrogen fluoride and hydrogen chloride | 1–3% |

The two impurities of greatest concern are arsenic and tetrachloroethane. Arsenic as arsenic trifluoride is an impurity present in the hydrogen fluoride, arsenic being generally present in the fluorspar from which hydrogen fluoride is derived. The amount of arsenic impurity present in the hydrogen fluoride thus varies from source to source. Tetrachloroethane as well as other $C_2$–$C_6$ or higher boiling halocarbons or organic halogen compounds are formed during the fluorocarbon production process through undesirable side reactions.

The United States fluorocarbon industry generates approximately 500 metric tons of spent catalyst per year, but the significance is in the magnitude of the hazard and the potential for recovery and recycle, rather than in the annual volume of hazardous waste produced as such.

Several attempts have been made previously seeking to recover metal values from spent fluorocarbon catalysts. These attempts may be divided into two general categories: the recovery of antimony and/or arsenic from spent antimony catalyst in a non-recyclable catalyst form, and the recovery of antimony in a recyclable catalyst form.

U.S. Pat. Nos. 3,872,210 and 4,411,874 teach the general concept of extracting metals from spent catalysts into an aqueous phase. U.S. Pat. No. 3,872,210 teaches the use of aqueous acids or water to extract antimony while allowing recovery of oxide, hydroxide, sulfide or oxychloride antimony species. U.S. Pat. No. 4,411,874 discloses the use of $CaCl_2$ solutions with recovery of antimony oxide, sulfide, hydroxide, and/or oxychloride salts. Arsenic separation is never considered nor discussed. neither patent appreciates the desirability of Sb(V) reduction to Sb(III) to allow for improved extraction. Nor does either patent disclose suitable methods for recovery of both antimony and arsenic values from the spent catalyst in a form appropriate for recycle to $SbCl_5$ production and/or $AsCl_3$, $As_2O_3$ or arsenic metal production. Neither patent is concerned with the recovery of an incinerable organic stream.

U.S. Pat. Nos. 4,005,176 and 3,760,059 address the recovery of antimony values from spent catalyst in a form appropriate for catalyst recycle. Both patents are concerned with anhydrous systems and are not concerned with arsenic. U.S. Pat. No. 3,806,589 uses aqueous conditions but teaches Sb(V) reduction techniques, $NH_3$ precipitation and distillation for $SbCl_3$ recovery.

At the present time only limited technology exists to properly treat the extremely hazardous, toxic and potentially carcinogenic halocarbon wastes found in spent catalysts used in the production of fluorocarbons by means of a continuous contained process.

OBJECTS OF THE INVENTION

Thus, it is a general object of the present invention to provide a novel process which recovers metal or metal compounds from a spent antimony catalyst such as that used in the preparation of fluorocarbons, and thereby provide an easy means of reuse or recycle of many of the components found therein while allowing disposal by incineration or landfill of other components of the spent catalyst.

It is a more specific object of the present invention to recover arsenic as well as antimony from such a spent catalyst.

It is a further object of the present invention to produce a halocarbon stream from the spent antimony catalyst in a manner such that the stream is suitable for disposal by incineration after recovery of any recyclable chlorocarbon/fluorocarbon component.

It is another object of the present invention to recover the aqueous effluent from the spent antimony catalyst in a manner such that the aqueous effluent may be solidified to produce a nonhazardous solid waste for disposal.

These and other objects will be more apparent when taken in conjunction with the following disclosure, accompanying drawings and the appended claims.

SUMMARY OF THE INVENTION

According to the present invention, a novel process has been developed for recovering valuable metals from a spent antimony catalyst such as that used in the production of fluorocarbons. Advantageously, the organic phase which contains halocarbons, as well as the aqueous effluent may be readily disposed of in an environmentally acceptable manner. In essence, the process involves reducing the antimony pentachloride available in the spent catalyst to antimony trichloride; extracting the antimony trichloride and any arsenic trichloride from the reduced spent catalyst using an aqueous acid; separating the aqueous layer containing antimony trichloride and arsenic trichloride from the organic phase which contains halocarbons; and recovering antimony and arsenic from the aqueous phase.

Thus, arsenic, antimony and halocarbons can be recovered from spent antimony chloride catalyst with almost total recycle or reuse of the metal values followed by recycle or incineration of halocarbons. The final solid waste products of the present invention are minimal compared to the amount of initial spent catalyst.

DESCRIPTION OF THE PREFERRED EMBODIMENTS

Figure 1:
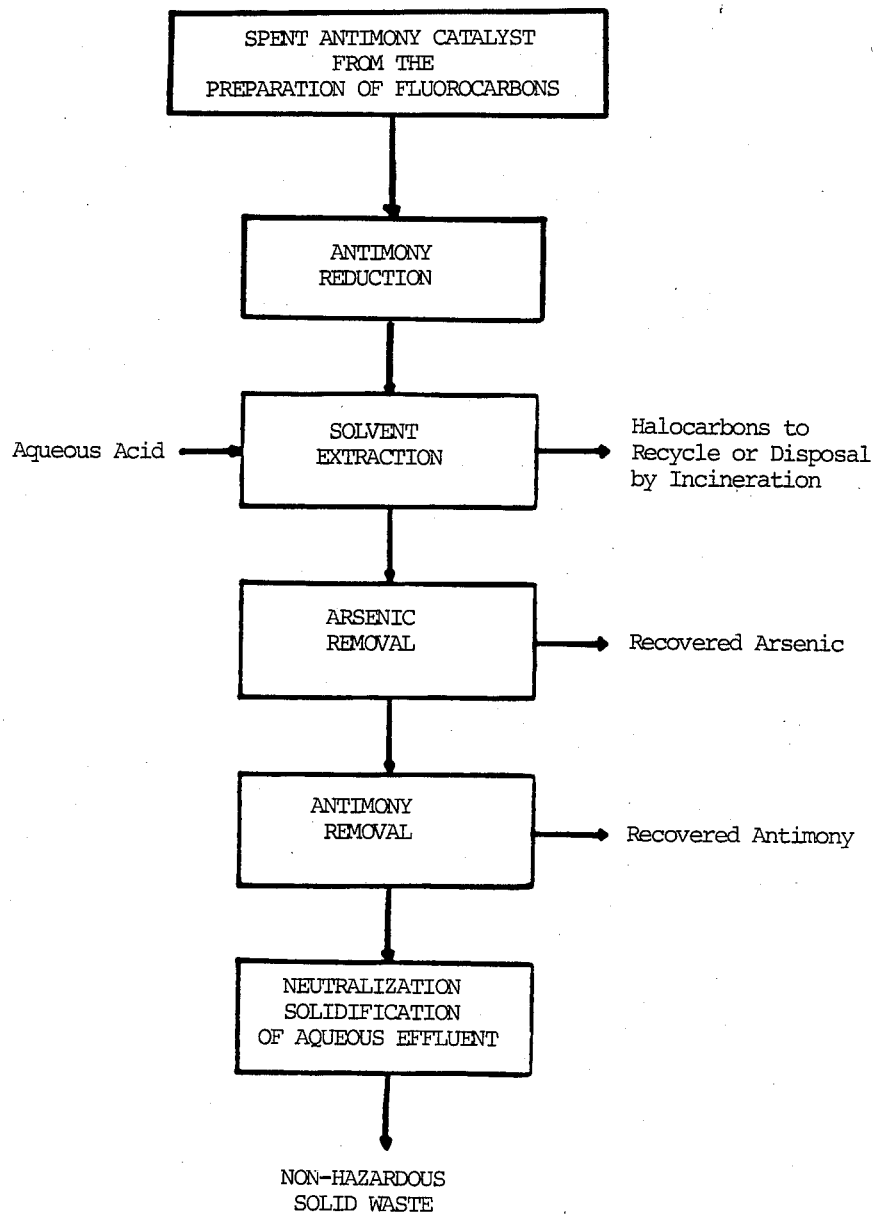
FIG. 1 is a process flowsheet for the recovery of arsenic and antimony from spent antimony catalyst.

A process flowsheet for the recovery of arsenic and antimony from spent antimony catalyst is depicted in FIG. 1. Also depicted is the separation of the organic layer containing halocarbons. The organic layer may be recycled or disposed of by incineration. The final aqueous effluent may be neutralized and solidified and is suitable for landfill.

Antimony in the spent catalyst is present in both the Sb(V) and the Sb(III) oxidation states. Prior to extraction of the antimony and arsenic from the spent catalyst, the antimony pentachloride [Sb(V)] remaining in the catalyst is reduced to antimony trichloride [Sb(III)]. This is done to achieve effective antimony extraction, thus avoiding the presence of two distribution coefficients for antimony during extraction. The distribution coefficient (concentration of antimony in the aqueous phase divided by the concentration of antimony in the organic phase at equilibrium) is higher for Sb(III) than for Sb(V), thus permitting higher percentage extraction of Sb(III) compared to Sb(V) in each extraction stage. In addition, the heat of extraction of Sb(III) is about one-half that of Sb(V) and, thus, reduction of Sb(V) to Sb(III) allows extraction with significantly less exothermic heat of extraction. Lower heats simplify extraction design, reduce operating problems relative to vapor containment, and improve safety of operation.

Additional data relative to the extraction of metals (Sb/As) from spent fluorocarbon catalyst was obtained in a series of four tests.

Samples of spent catalyst from two commercial sources were first extracted, as received, with 10% HCl. Extraction was performed in a single contact with 1/1 ratio of 10% HCl/spent catalyst. Heats of extraction were measured and both $C_xCl_y$ and aqueous phases recovered for analysis.

Next, both spent catalyst feeds were reacted with Sb metal to reduce Sb(V) to Sb(III). The reduced spent catalysts were then extracted with 10% HCl. Extraction was again performed in a single contact with 1/1 ratio of 10% HCl to reduced spent catalyst. Heats of extraction were measured and both $C_xCl_y$ and aqueous phases recovered for analysis.

Analytical data for the feeds and products from all four tests are shown in Table 1. Performance data with respect to heats of extraction and antimony partition coefficient for the tests are presented in Table 2.

Two principal conclusions are drawn from this testwork:

(1) Reduction of Sb(V) to Sb(III) in spent catalysts, prior to extraction with 10% HCl, results in a substantial (approximately 50-60%) decrease in the heat of extraction; minimizing heat of extraction is important in the design and operation of extraction hardware; minimizing heat of extraction also reduces the hazards associated with volatilization of $AsCl_3$ and/or $C_xCl_y$ from the extraction apparatus.

(2) Reduction of Sb(V) to Sb(III) also results in extractions of Sb at substantially higher partition coefficients; high partition coefficients for Sb lead to extractions which require less aqueous extractant to achieve acceptable extraction or fewer extraction stages to achieve antimony removal; either consequence is important in terms of capital and operating costs for the extraction system; in general, solvent extraction systems are operated under conditions which maximize partition coefficients for recovered components.

TABLE 1

Extraction Test Data
Spent Antimony Fluorocarbon Catalysts A and B
With and Without Sb(V) Reduction
10% HCl Extractant; Single Contact;
A/O = 1/1 (wt/wt)

| Sample | Wt (g) | Sb(v) | %<br>Sb(III) | Total Sb | As | Wt(g)<br>Sb | As |
|---|---|---|---|---|---|---|---|
| Spent Cat. A | 168 | 14 | 6 | 20 | 4 | 34 | 6.7 |
| Organic Phase | 62 | — | 0.15 | 0.15 | 1.01 | 0.1 | 0.6 |
| Aqueous Phase | 277 | — | 13.3 | 13.3 | 2.3 | 37 | 5.5 |
| Reduced Spent Cat. A | 250 | <0.5 | 25 | 25 | 4 | 63 | 10 |
| Organic Phase | 87 | — | 0.10 | 0.10 | 0.08 | 0.1 | 0.1 |
| Aqueous Phase | 422 | — | 15.3 | 15.3 | 2.4 | 64 | 10 |
| Spent Cat. B | 46 | 13 | 7 | 20 | 3 | 9.2 | 1.4 |
| Organic Phase | 13 | — | 0.22 | 0.22 | 0.13 | <0.1 | <0.1 |
| Aqueous Phase | 72 | — | 13.5 | 13.5 | 1.26 | 9.7 | 0.9 |
| Reduced Spent Cat. B | 321 | <0.5 | 23 | 23 | 3 | 74 | 9.6 |
| Organic Phase | 124 | — | 0.15 | 0.15 | 0.23 | 0.2 | 0.3 |
| Aqueous Phase | 499 | — | 14.9 | 14.9 | 1.52 | 74 | 7.6 |

TABLE 2

Performance Data
Spent Antimony Fluorocarbon Catalysts A and B
With and Without Reduction

| Feed | (BTU/lb Feed) Heat of Extraction | Sb Distribution Coefficient (lb $Sb_{Aq}$/lb $Sb_{C_xCl_y}$) |
|---|---|---|
| Spent Cat. A | 89 | 370 |
| Reduced Spent Cat. A | 42 | 640 |
| Spent Cat. B | 96 | 97 |
| Reduced Spent Cat. B | 39 | 370 |

The reduction of antimony pentachloride to antimony trichloride may be carried out using any reductant known in the art. Suitable reductants include antimony metal, arsenic metal, an antimony-arsenic alloy, or the like. The preferred reductant is antimony metal or an antimony-arsenic alloy.

An aqueous acid is then added to the reduced spent catalyst to extract the antimony (III) and arsenic (III) as salts into an aqueous layer. Hydrochloric acid is preferred in the practice of the present invention. Other aqueous acids such as $H_2SO_4$ or $H_3PO_4$ may be used also but usually result in much poorer extraction. Extraction efficiencies in excess of 99% may be obtained with hydrochloric acid under suitable conditions of acidity and aqueous/organic suitable conditions of acidity and aqueous/organic phase ratios. Aqueous acid strengths of approximately 5 to 50% are preferred, aqueous hydrochloric acid containing approximately 10% to 38% HCl being most preferred. A broad range of aqueous acid to spent catalyst ratios are suitable in the practice of the present invention. The amount of aqueous acid used is preferably sufficient to extract a majority of the antimony and arsenic from the spent catalyst. Aqueous acid to spent catalyst ratios of approximately 0.5:1 to about 10:1 are generally used. The preferred aqueous acid to spent catalyst ratio is in the range of about 1:1 to about 3:1.

The aqueous acid may be added in any number of stages during countercurrent extraction with the aqueous acid. A three- to four-stage countercurrent extraction is preferred with an aqueous:organic ratio of approximately 1:1 overall.

The addition of the aqueous acid is preferably conducted in a vapor tight system and the exothermic heat of mixing is removed during the addition. The time over which the aqueous acid is added is not particularly important. An addition time of approximately 30 seconds to 30 minutes is suitable. However, approximately 1 to 10 minutes contact time is preferred.

The organic phase is then separated from the aqueous phase by any procedure known in the art. For instance, the aqueous layer containing the arsenic and antimony may be simply decanted or separated using a separating funnel. In addition, phase separating agents, such as detergents, may be added to aid in phase separation.

The composition of the organic phase of the spent antimony catalyst may be highly complex and variable. While the primary components of the organic phase typically include $C_1$–$C_6$ chlorocarbons and chlorofluorocarbons, e.g. $CH_2Cl_2$, $CHCl_3$, $CCl_4$, $C_2Cl_3F_3$, $C_2H_2Cl_4$, $C_3HCl_5$, $C_4HF_3Cl_4$, and $C_6H_6Cl_6$, a total of over forty halocarbon components have been identified using gas chromatograph and mass spectroscopy techniques. The complex nature of the organic halocarbon mixture derives in part from the accumulation of impurities in the fluorocarbon reactors during catalyst use and in part from the catalytic side reactions and product-byproduct coupling reactions.

The arsenic and antimony and inorganic halogen compounds such as inorganic fluorine compounds must be substantially removed from the halocarbons before the halocarbons are incinerated and destroyed. This is desirable not only because the arsenic and antimony remain commercially valuable and are therefore worth recovering, but also the presence of inorganic halogen compounds in the incinerator prematurely ages the incinerator. Further, the arsenic and antimony could overburden the capacity of the incinerator and be released into the air with undesirable consequences.

Absent some utility for the foregoing organic composition, it is desirable simply to dispose of the entire organic composition after recovery of the aqueous layer. Since there is such a variety of components present in the organic layer, disposal by landfill is not recommended. However, if the amount of the residual arsenic and antimony which remains in the organic phase is less than about 0.05%, the organic composition is acceptable for incinerator feed. As typical metal levels in the clean organic phase obtained in the process are less than 0.05% arsenic and less than 0.05% antimony, its disosal by incineration is suitable.

A variety of techniques are possible for recovering the arsenic and antimony from the aqueous acid extract. Possible techniques for the recovery of arsenic and antimony from the aqueous phase include distillation of $SbCl_3/AsCl_3$, crystallization of $SbCl_3$, precipitation of $Sb_2S_3/As_2S_3$, volatilization of $AsH_3$, reduction to $Sb(O)/As(O)$, and the like. The recovery of antimony and arsenic by selective reduction of antimony and arsenic to antimony metal [Sb(O)] and arsenic metal [As(O)], respectively, is preferred.

Recovery may include reduction of As(III) to As(O) by sodium hypophosphite; reduction of Sb(III) to Sb(O) by active metals such as iron, magnesium, zinc, aluminum, cobalt, lead, and the like; reduction of As(III) and Sb(III) together by active metals; and electroreduction of As(III) and Sb(III) to produce a mixed As-Sb metal product. The sequential reduction of As(III) and Sb(III) from the aqueous extract requires that As(III) be removed first because any Sb(O) present in the system reduces As(III) to As(O). The preferred reductant for As(III) is sodium hypophosphite, although other reductants such as sodium borohydride or the like, may also be useful. Reduction using sodium hypophosphite is particularly advantageous because this reagent allows for selective As(III) reduction with little or no $AsH_3$ production at the reduction temperature. The amount of the reductant used ranges from about stoichiometric to about three times stoichiometric, based on the amount of arsenic in the aqueous phase. The preferred amount of reductant is from about stoichiometric to about twice stoichiometric. The temperature is generally within the range of about 25° C. to 90° C.

Following recovery of the arsenic, the antimony may be recovered by a variety of techniques. The antimony may be recovered either as antimony metal or as antimony trichloride. Antimony metal is the preferred recovery product. The Sb(III) may be reduced by electrochemical or cementation techniques.

Electrochemical recovery of antimony may be accomplished by plating antimony onto a suitable cathode in an electrolysis cell in a manner that is otherwise well known. Suitable cathodes may include carbon, iron, antimony, copper, and the like. The electrolytic cell will also contain an anode, isolated in a suitable diaphragm chamber, at which chlorine is produced. Carbon or graphite are suitable anode materials. Ceramic diaphragm materials are suitable to isolate the anode. Byproduct chlorine may be collected for purification and use or may be scrubbed with suitable agents for disposal.

A source of D.C. power will be required for the operation of the cell. Rectifier, battery, motor generator, or similar systems capable of delivering adequate current, to meet recovery demands, at 2–12 volts, are suitable.

Barren catholyte from the electrolysis cell, which is not recycled to the extraction circuit, is suitable for neutralization and solidification.

The antimony product from the cathodes is suitable for refining by the techniques used to purify cementation antimony.

Cementation is the reduction of a soluble metal by a more active metal. The reduction of Cu(II) to Cu(O) by iron or aluminum metal is probably the largest commercial application of this procedure. Suitable metals to use in cementation include iron, aluminum, magnesium and zinc. Both As and Sb may be recovered by such cementation. Under proper conditions, the recovered (cemented) metal product may be >90% pure with the major impurity being unreacted (encapsulated) particles of the reactive metal reductant. In practice, the choice of reductant metal is a function of several factors including economic, electrochemical, and environmental considerations. Since the reductant metal is solubilized in the course of the cementation reaction the choice of metal should be directed at minimizing the eventual disposal associated with this reductant.

The cemented antimony product is a finely divided powder which exhibits high reactivity with oxygen (air) at temperatures above about 100° C. Thus, prior to further refining or use the cemented metal requires drying and cooling in an inert or vacuum atmosphere.

The antimony product from cementation is not pure enough for direct sale to existing antimony markets and is also too impure for recycle in antimony catalyst manufacture. The chief impurities in the cementation Sb product are unreacted reductant, e.g., Al(O), and co-cemented As(O). An $NaOH-Na_2CO_3$ flux system, such as is commonly used in antimony refining practice, serves to purify the cementation product. The inclusion of a small amount of powdered carbon in the flux can serve to reduce any Sb-O surface compounds formed in the drying step.

At any rate, antimony and arsenic products recovered in the above procedures may be converted to recyclable or saleable products by known technology. Recyclable or saleable products include As, $AsCl_3$, $As_2O_3$, Sb, $SbCl_3$, $SbCl_5$, and the like.

Arsenic(III) may be selectively reduced with $NaH_2PO_2$ to produce elemental arsenic. Conversion of this material to $AsCl_3$, $As_2O_3$, or high purity arsenic will serve existing markets. Antimony(III) may be reduced with powdered aluminum to elemental antimony. This material may require further refining to produce antimony metal of greater than 99% purity for recycle. There is a potential growth market for high purity (99.999–99.99999% pure) arsenic metal in the electronics industry and it is expected to command a high price. Process steps, especially those involving arsenic, should be designed for effective containment so as to keep worker exposure and/or emission of arsenic at a minimum.

Potential markets for the recovered antimony, in addition to its use in fluorocarbon production, may include the use of $Sb_2O_5$ as a flame retardant and the use of antimony metal in alloy production. Chlorination of antimony metal produces $SbCl_3$ or $SbCl_5$.

After recovery of arsenic and antimony values from the aqueous acid stream, it is possible to neutralize and solidify the aqueous stream for ultimate isposal by burial in a secure landfill. This may include operations to minimize quantity of waste by recycling acid and water, and to assure fixation of any leachable trace metals in the final solid waste.

The aqueous acid effluent may be neutralized and solidified with agents such as hydrated or burnt lime, $Ca(OH)_2$ or CaO, limestone ($CaCO_3$), dolomite ($CaCO_3/MgCO_3$), NaOH, fly ash, $Na_2CO_3$, $NaHCO_3$, and the like. The preferred solidifying agent is $Ca(OH)_2$. The preferred addition range is about 0.2 to 1.0 parts $Ca(OH)_2$ per part of effluent. Leachable arsenic and other toxic metal levels in the solidified waste of the present invention are within the limits for hazardous waste designation and the solidified aqueous effluent is suitable for landfill. Thus, treatment of aqueous effluent with neutralizing-solidifying agents produces a nonhazardous solid waste suitable for disposal by burial in approved sites.

Figure 2:
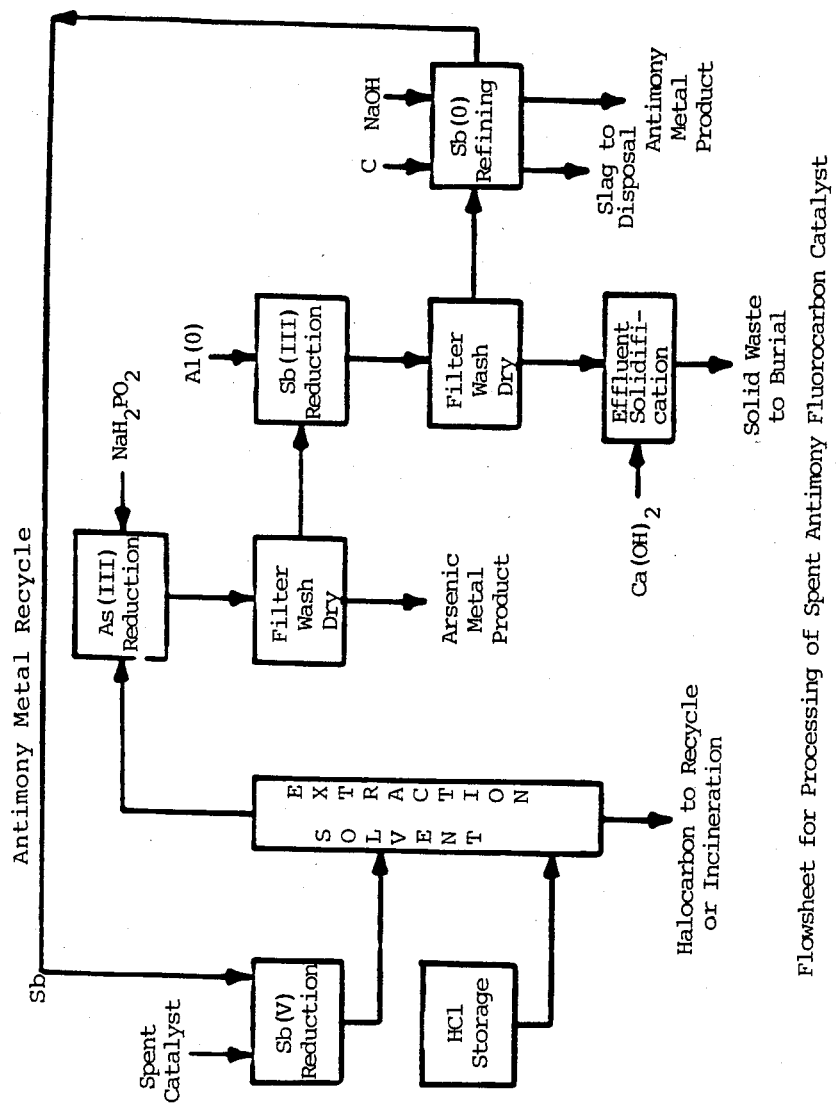
FIG. 2 depicts an integrated process flowsheet from the unit operations.

FIG. 2 depicts an integrated process flowsheet from the unit operations. The following unit operations are included as being exemplary of the present invention:
(1) Sb(V) to Sb(III) reduction
(2) As(III)/Sb(III) extraction
(3) Reduction of As(III) by hypophosphite
(4) Cementation of Sb
(5) Refining of Sb
(6) Solidification of process effluent

EXAMPLE 1

Extraction of Antimony and Arsenic from Spent Antimony Catalyst Using Aqueous Acid The extraction behavior of Sb(III) and As(III) from spent catalyst was screened using varying aqueous HCl strengths and varying organic phase:aqueous phase (O:A) ratios. The screening tests were constrained in HCl concentration by the maximum concentration of commercially available HCl (38%) and by a minimum concentration of 10% HCl below which oftentimes hydrolysis and oxychloride precipitation occurs. Screening tests were performed with spent catalyst liquors containing only trivalent antimony since Sb(III) was much more extractable than Sb(V).

Table 3 summarizes screening data for extraction of Sb(III) and As(III) from spent catalyst under varying conditions. The data include extraction of spent catalyst with varying arsenic and antimony contents as a measure of extraction flexibility.

TABLE 3

Extraction of As(III)/Sb(III) with HCl

| Test | Aq. HCl Strength | O:A | Feed % As | Feed % Sb | Aqueous % As | Aqueous % Sb | Organic % As | Organic % Sb |
|---|---|---|---|---|---|---|---|---|
| 1 | 10% | 3:1 | 12.26 | 8.90 | 8.47 | 13.13 | 10.81 | <0.03 |
| 2 | 20% | 3:1 | 12.26 | 8.90 | 5.92 | 13.63 | 12.28 | 0.35 |
| 3 | 30% | 3:1 | 12.26 | 8.90 | 1.78 | 13.40 | 14.59 | 0.21 |
| 4 | 10% | 1:1 | 12.26 | 8.90 | 7.84 | 5.72 | 0.23 | <0.03 |
| 5 | 10% | 1:1 | 15.40 | 2.53 | 10.21 | 1.72 | 0.58 | <0.03 |
| 6* | 10% | 1:1 | 10.50 | 5.58 | 4.18 | 7.86 | <0.03 | <0.03 |
| 7 | 10% | 2:1 | 10.50 | 5.58 | 4.91 | 4.42 | 0.05 | <0.03 |
| 8 | 10% | 1:1 | 4.65 | 8.98 | 2.87 | 5.63 | 0.11 | <0.03 |
| 9 | 10% | 1:1 | 4.27 | 15.89 | 2.87 | 7.81 | 0.33 | <0.03 |

*Best case

The screening test data led to the following conclusions with regard to Sb(III)/As(III) extraction: 10% aqueous HCl is the preferred extractant; extraction at an O:A ratio of about 2:1 or less is necessary to achieve arsenic levels of about 0.05% in the halocarbon phase. Countercurrent extraction with three stages and O:A=1:1 overall is preferred to minimize aqueous weight. Sb(III) extracts more readily than As(III) at all acid strengths tested; and aqueous HCl is an effective extractant for Sb and As over a range of spent catalyst compositions.

Figure 3:
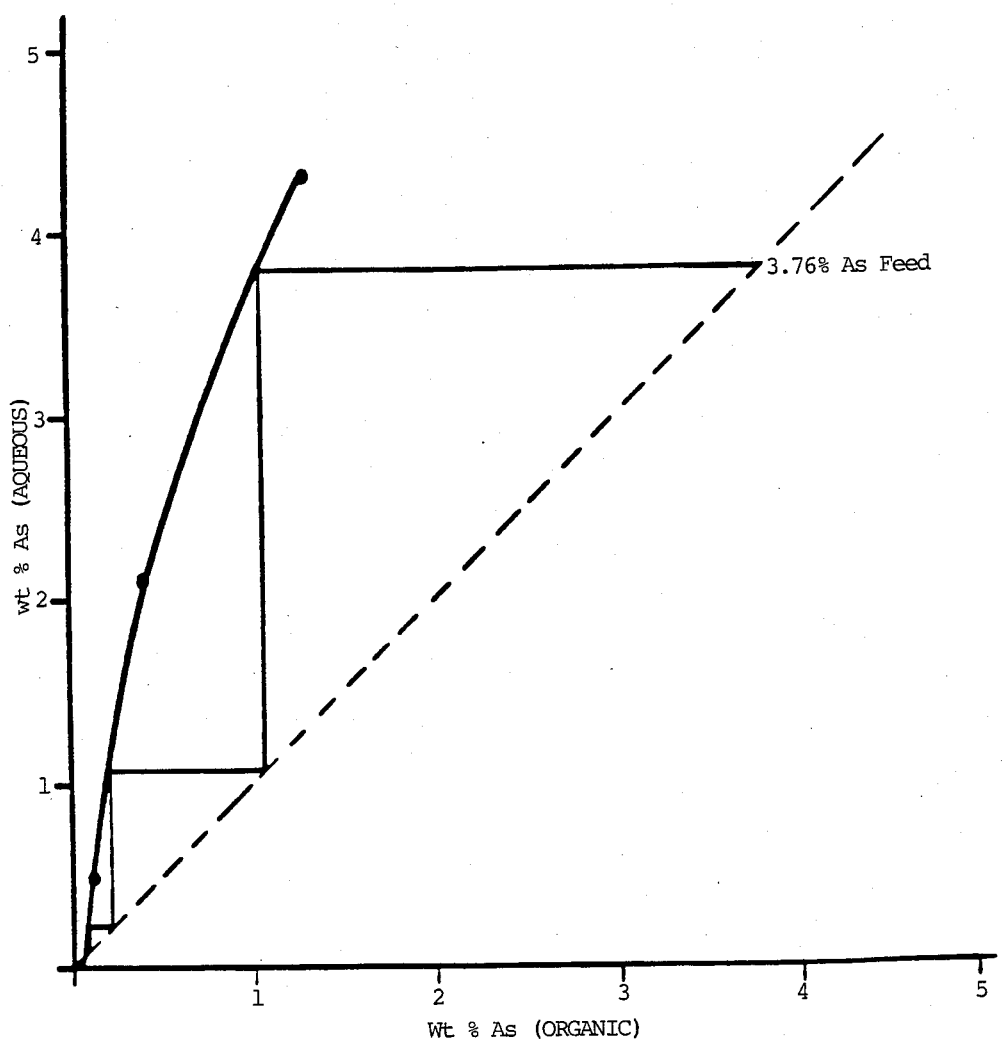
FIG. 3 is a stage determination plot for a three-stage extraction of arsenic (III) from spent antimony catalyst using 10%-HCl and an organic to aqueous ratio of 3 to 1. The initial reduced spent catalyst feed contained 9.16% $AsCl_3$ (3.76% As), 19.8% $SbCl_3$ and 71.0% $C_xCl_y$.
Figure 4:
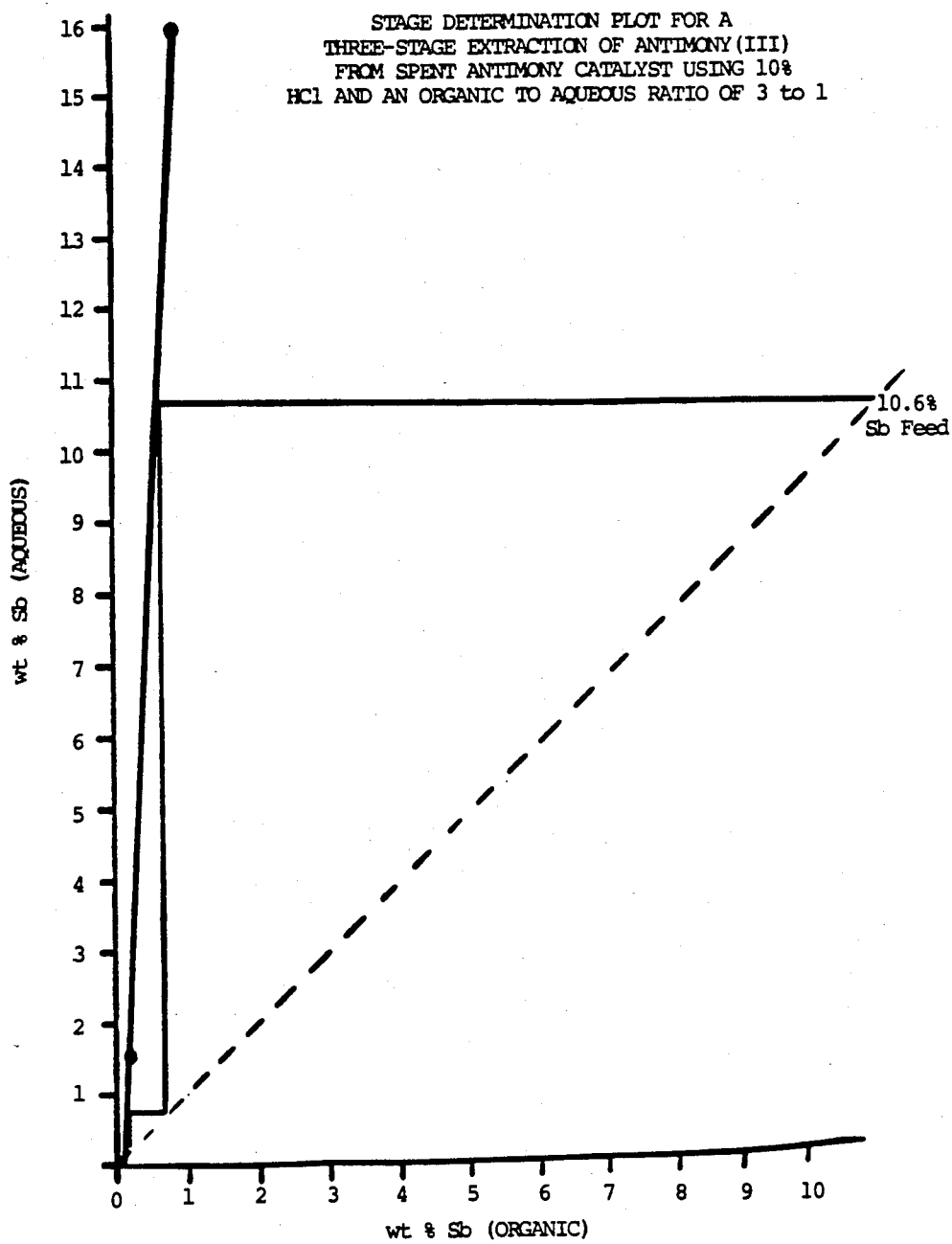
FIG. 4 is a stage determination plot for a three-stage extraction of antimony (III) from spent antimony catalyst using 10% HCl and an organic to aqueous ratio of 3 to 1. The initial spent catalyst contained 9.16% $AsCl_3$ (3.76% As), 19.8% $SbCl_3$ and 71.0% $C_xCl_y$.

Based upon these data, a sequential three-stage extraction test was performed on a catalyst using O:A of 3:1 in each stage. Composition data for As and Sb concentration in aqueous and organic phases from each stage were then plotted to evaluate stage demands for an extraction system. FIGS. 3 and 4 present stage determination plots for arsenic and antimony extraction, respectively. The feed composition in this test was 9.16% $AsCl_3$, 19.8% $SbCl_3$, 71% $C_xCl_y$.

This work indicates that a solvent extraction circuit with three or four stages of contact using 10% HCl as extractant, at an overall organic to aqueous phase ratio of 1:1 produces an organic phase with both As and Sb of less than 0.05%. Extraction tests using three stages of extraction with 10% HCl and spent catalyst of varying Sb(III)/As(III) compositions confirmed this projection. Data for these 3-stage tests are shown in Table 4. In all cases acceptable As/Sb extraction was achieved. During the extraction, there was an organic:aqueous ratio of at least 3:1 in each stage, 3 minutes contact and 10 minutes phase separation.

TABLE 4

3-Stage Extraction Using 10% HCl

| Test | Sent Catalyst Feed | | Organic Phase | |
|---|---|---|---|---|
| | % Sb | % As | % Sb | % As |
| 1 | 2.53 | 15.4 | <0.03 | 0.04 |
| 2 | 8.63 | 7.73 | <0.03 | <0.03 |
| 3 | 10.5 | 5.58 | <0.03 | <0.03 |
| 4 | 15.9 | 4.27 | <0.03 | 0.05 |
| 5 | 27.4 | 5.25 | 0.05 | 0.04 |

EXAMPLE 2

A test was conducted using an aqueous hydrochloric acid extract of a spent antimony catalyst to evaluate the efficacy of sodium hypophosphite ($NaH_2PO_2$) reduction of As(III) in the aqueous extract. Basically, all $AsCl_3$ and $SbCl_3$ present in the spent catalyst goes into solution in 10% HCl. The approximate composition of the aqueous extract is set forth in Table 5 below:

TABLE 5

| Composition of the Aqueous Extract | |
|---|---|
| $AsCl_3$ | 12-24% |
| $SbCl_3$ | 5-30% |
| HCl | 10-15% |
| Water | 65-75% |

Six samples were evaluated. The tests were conducted by adding a saturated solution of $NaH_2PO_2$ to the stirred aqueous (10%) HCl extract at approximately 90° C. Precipitated arsenic was collected by filtration. The results for the AS(III) reduction tests are set forth in Table 6. "Aq BARREN" refers to the aqueous phase remaining after recovery of the arsenic. In test samples 1, 2, 4 and 5, the arsenic precipitate was washed only with water. In test samples 3 and 6, the arsenic precipitate was washed with 3M HCl followed by water.

TABLE 6

| Test | % STOICH $NaH_2PO_2$ | Aq. FEED | | Aq. BARREN | | PRECIPITATE | |
|---|---|---|---|---|---|---|---|
| | | % As | % Sb | % As | % Sb | % As* | % Sb* |
| 1 | 100 | 9.86 | 3.45 | 1.32 | 0.69 | 55 | 53 |
| 2 | 150 | 9.86 | 3.45 | 0.54 | 0.99 | 87 | 55 |
| 3 | 150 | 4.91 | 4.42 | 0.69 | 3.43 | 83 | 4 |
| 4 | 200 | 2.00 | 0.24 | 0.26 | 0.11 | 84 | 44 |
| 5 | 200 | 5.29 | 0.28 | 0.03 | 0.14 | 99 | 39 |
| 6 | 200 | 5.82 | 11.19 | 0.15 | 9.05 | 98 | 2 |

*% of metal from feed in precipitate

Table 6 indicates that the precipitation of As(III) from 10% HCl is nearly quantitative when 100% excess of $NaH_2PO_2$ is used. The apparent co-reduction of Sb(III) is probably a precipitation of SbOCl and is remedied by washing the AS(O) precipitate with 10% HCl followed by water as shown with samples 3 and 6. With a proper wash sequence to avoid SbOCl precipitation, the crude As(O) product after the reduction step contains low levels of Sb, some phosphorus and substantial amounts of water. Table 7 summarizes the analytical data for As(O) recovered by this process step.

TABLE 7

| Crude As(O) Product | |
|---|---|
| As | 63-74% |
| Sb | 0.8-0.9% |
| P | 0.8-1.3% |
| Na, Ca, Cu | TRACE |
| $H_2O$ | about 20% |

EXAMPLE 3

Antimony Recovery by Selective Reduction

The aqueous HCl solution recovered after filtration of the As(O) precipitate was used for the recovery of antimony metal using cementation techniques.

Laboratory tests were performed to evaluate several reductant metals as potential candidates for antimony reduction (cementation). All tests were performed with 10% aqueous HCl solutions at 90° C. Test data for the cementation tests are summarized in Table 8. The solution composition range and the level of reductant metal addition (125% of stoichoimetric) were selected to point out activity differences over a wide span of Sb(III) concentrations. The reductant metal was present as a powder at 125% of stoichiometric amount for the reaction $nM+Sb(III) \rightarrow 3M(n)+nSb(O)$. "Aq. BARREN" refers to the aqueous phase remaining after recovery of the antimony.

TABLE 8

Sb(III) Cementation

| REDUCTANT METAL | Aq. FEED % Sb | Aq. BARREN % Sb | PRECIPITATED ANTIMONY % |
|---|---|---|---|
| Zn | 29.4 | 0.21 | 98 |
| Al | 29.4 | <0.03 | >99 |
| Fe | 29.4 | 5.42 | 34 |
| Pb | 29.4 | 2.17 | 73 |
| Cu | 29.4 | 2.73 | 52 |
| Mg | 29.4 | <0.03 | >99 |
| Mg | 3.32 | 0.37 | 35 |
| Al | 3.32 | <0.03 | 97 |
| Zn | 3.32 | <0.03 | 97 |
| Cu | 3.32 | 0.21 | 71 |

Based upon the results of this screening test, it was concluded that aluminum, zinc, and magnesium were the best cementation candidates. Aluminum and magnesium salts which are the byproduct of aluminum or magnesium cementation of Sb(III) are substantially more benign environmentally than are Zn(II) salts.

Figure 5:
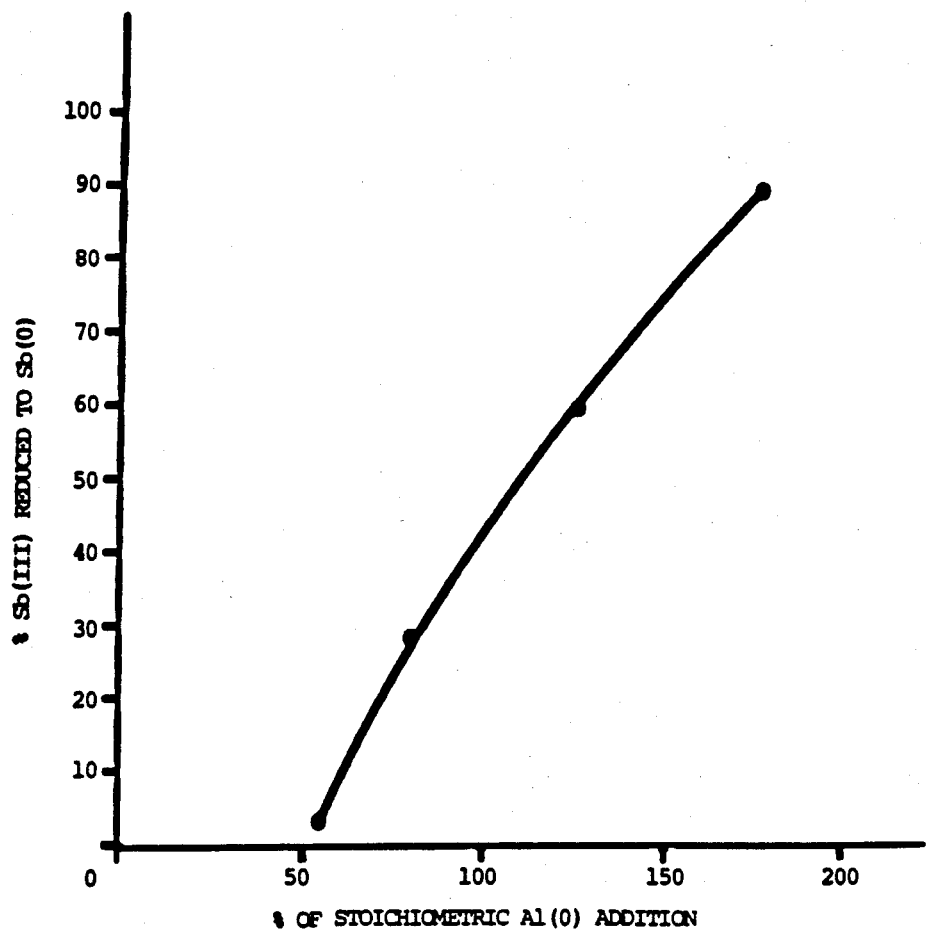
FIG. 5 represents a graphic summary of test results which plot % Sb (III) cementation versus %Al(O) reductant.

The choice of aluminum as the preferred reductant for Sb(III) was followed by laboratory tests to better evaluate the relationship between Al(O) reductant excess and Sb(III) removal from solution as antimony metal. FIG. 5 presents a graphic summary of test results which plot %Sb(III) cementation against %Al(O) reductant excess. All tests were performed with 10% HCl feed containing 6.80% Sb using powdered aluminum as reductant at 90° C. Based upon these tests, a 150% excess Al(O), i.e. 0.33 lb Al/lb Sb(III) in solution was determined to be a practical addition level. Additions of aluminum in excess of about 150% of stoichiometric result in the recovery of proportionately less antimony per added weight. At levels much below 150% of stoichiometric, more Al(O) was consumed by side reaction (e.g. with HCl) with no Sb (III) reduction.

After drying the cementation antimony was found to have a typical composition range as follows:

| | |
|---|---|
| Sb | 80-95% |
| As | <5 |
| Al | 5-15 |
| Oxide | 0-10 |

EXAMPLE 4

Purification of Antimony for Recycle

The antimony product from Example 3 was purified. Laboratory smelting tests with a mixture of 20 g of cementation Sb, 10 g NaOH, and 1-2 grams powdered carbon were performed at 600°-650° C. in zirconium crucibles. Under these conditions the slag was fluid enough to permit good coalescence of Sb droplets and a clean, refined Sb metal bead was recovered on cooling the melt. Recovery of Sb from the smelting step was 90-95% with the only loss being attributed to Sb solubility in the slag (7% Sb at saturation in final slag). Analysis of the refined antimony indicated the only major impurity to be arsenic (0.27%). Use of this refined Sb in laboratory tests to produce antimony pentachloride fluorocarbon catalyst confirmed the acceptability of the refined product for recycle.

EXAMPLE 5

Neutralization and Solidification of the Aqueous Effluent

The barren aqueous acid stream from the antimony cementation in Example 4 contained low levels of Sb and As, phosphate, and aluminum. The stream was acid (pH about 1) and required treatment prior to disposal to produce a nonhazardous solid waste.

Laboratory tests investigated the physical properties of mixtures of barren cementation liquor (effluent) with varying amounts of Ca(OH)$_2$ and of fly ash to produce a solidified waste. Table 9 presents data relative to these waste mixtures. The metals composition of the effluent was approximately 0.02% As, 1.31% Sb and 5% Al.

TABLE 9

Composition of Solid Waste

| Sample No. | Effluent | Ca(OH)$_2$ | FLY ASH | QUALITATIVE DESCRIPTION |
|---|---|---|---|---|
| 1 | 80 wt % | 20 wt % | — | Settled solids with free liquid |
| 2 | 77 | 23 | — | Fluid Paste setting to solid in 48 hr. |
| 3 | 67 | 33 | — | Solid, semi-granular solids |
| 4 | 67 | 20 | 13 wt % | Fluid Paste setting to solid in 48 hr. |

These solidification tests showed that the mixing of process effluent with Ca(OH)$_2$ or with Ca(OH)$_2$ and fly ash to produce a mixture containing about 67% effluent, yielded a paste which was fluid enough to mix and discharge into disposal drums. The fluid paste set to a solid mass (no slump at 90° tilt) within 48 hours. This solid mass showed no separate liquid phase and exhibited no liquid phase separation upon remixing or vibrating.

The solidified waste products (Table 9) were next subjected to testing for leachable metals content by the EP toxicity protocol. (EP Toxicity Test Procedure, 40 C.F.R. 261.24, U.S. Federal Register, May 19, 1980.) Table 10 summarizes data relative to the leach solution and extract preparation. The 0.5M CH$_3$COOH is a maximum of 4-times solid weight. Additional water is the amount of water necessary to bring equal dilution. Table 11 presents data for extract concentrations of As, Ba, Ag, Se, Hg, Cr, Cd and Pb; data were also included for Sb although it is not one of the elements being formally evaluated. The limit set forth in the last line of Table 11 is the limit above which waste is classified as hazardous. The soluble As levels in all four wastes were below the 5-mg/l criterion which would qualify the solidified effluent as a hazardous waste. Two samples (3 and 4) show maximum allowable Hg levels and three samples (2, 3 and 4) show maximum allowable Se levels, but no values for these or the other specified elements exceed the maximum allowable level for nonhazardous classification. On the basis of this test work, it was concluded that the barren cementation effluent can be solidified to produce a nonhazardous solid waste.

TABLE 10

EP Toxicity Tests - Leach Slurry and Extract Data

| Sample | Solid g | H$_2$O g | 0.5 M CH$_3$COOH g | Add'l H$_2$O g | Final pH |
|---|---|---|---|---|---|
| 1 | 5 | 80 | 5 | 15 | 5.0 |
| 2 | 5 | 80 | 15 | 5 | 5.0 |
| 3 | 5 | 80 | 20 | 0 | 9.3 |
| 4 | 5 | 80 | 20 | 0 | 6.6 |

TABLE 11

EP Toxicity Tests - Metal Content in Extract

| | mg/l in EXTRACT | | | | | | | | |
|---|---|---|---|---|---|---|---|---|---|
| Sample | As | Ba | Ag | Se | Hg | Cr | Cd | Pb | Sb |
| 1 | 0.3 | 0.2 | <0.1 | 0.6 | <0.2 | 0.1 | <0.1 | 0.1 | 33 |
| 2 | 0.2 | 0.4 | <0.1 | 1.0 | <0.2 | 0.1 | <0.1 | 0.2 | 22 |
| 3 | 2.5 | 1.2 | <0.1 | 1.0 | 0.2 | 0.1 | 0.1 | 0.2 | 11 |
| 4 | 0.9 | 9.9 | <0.1 | 1.0 | 0.2 | 0.1 | <0.1 | 0.2 | 8.6 |
| LIMIT | 5.0 | 100 | 5.0 | 1.0 | 0.2 | 5.0 | 2.0 | 5.0 | N/A |

In the absence of some indication to the contrary, all ratios, proportions and percentages are expressed on a weight basis throughout this specification and appended claims.

While the invention has now been described with reference to several preferred embodiments, those skilled in the art will appreciate that various substitutions, omissions, modifications, and changes may be made without departing from the scope or spirit hereof. Accordingly, it is intended that the foregoing description be considered merely exemplary of the invention and not a limitation thereof.

I claim:

1. A process for the recovery of antimony from spent antimony chloride catalyst which contains antimony pentachloride and organic halogen compounds, said process comprising the steps of:
    (a) reducing antimony pentachloride in the spent catalyst to antimony trichloride;
    (b) adding an aqueous acid to the reduced spent catalyst to extract the antimony trichloride into an aqueous layer;

(c) separating the aqueous layer containing antimony trichloride from an organic phase which contains organic halogen compounds; and (d) recovering antimony from the aqueous extract.

2. The process as recited in claim 1, wherein the antimony pentachloride in step a) is reduced using antimony metal, arsenic metal, or an antimony-arsenic alloy.

3. The process as recited in claim 1, wherein the aqueous acid in step b) is at least one acid selected from the group consisting of hydrochloric acid, $H_2SO_4$ and $H_3PO_4$.

4. A process for the recovery of antimony and arsenic from spent antimony chloride catalyst used in the production of fluorocarbons, which spent catalyst contains $SbCl_5$, $SbCl_3$, HCl, HF and halocarbon compounds containing 1 to 6 carbon atoms per molecule, said process comprising the steps of:

(a) reducing $SbCl_5$ in the spent catalyst to $SbCl_3$;

(b) adding an aqueous acid to the reduced spent catalyst to extract the $SbCl_3$ and $AsCl_3$ into an aqueous layer;

(c) mechanically separating the aqueous layer containing $SbCl_3$ and $AsCl_3$ from an organic phase which contains said halocarbon compounds; and (d) recovering antimony and arsenic from the aqueous layer.

5. The process as recited in claim 4, wherein the $SbCl_5$ in step (a) is reduced using antimony metal or an antimony-arsenic alloy.

6. The process as recited in claim 3, wherein the aqueous acid in step (b) is hydrochloric acid.

7. The process as recited in claim 3, wherein step (d) involves the selective reduction of arsenic trichloride to arsenic metal using sodium hypophosphite or sodium borohydride.

8. The process as recited in claim 3, wherein step (d) involves the sequential reduction of arsenic trichloride and antimony trichloride in the aqueous layer to metallic arsenic and antimony, first using sodium hypophosphite as a reductant for the arsenic trichloride and then a metal standing above antimony in the electromotive series as a reductant for the antimony trichloride.

9. The process as recited in claim 8, wherein said reductant metal is at least one metal of the group consisting of aluminum, zinc, magnesium, iron and copper.

10. The process as recited in claim 8, wherein said reductant metal in step (d) is aluminum and wherein the aqueous acid phase after separation of antimony metal therefrom is converted into solidified waste by addition of calcium hydroxide.

11. The process as recited in claim 8, wherein said reductant metal in step (d) is aluminum and wherein the aqueous acid phase from step (d) after recovery of antimony and arsenic therefrom is treated to obtain a solution of aluminum chloride.

12. The process as recited in claim 8, wherein said reductant metal in step (d) is aluminum.

13. The process as recited in claim 8, wherein the organic phase separated in step (c) is incinerated and wherein the selective reduction of antimony trichloride to antimony metal is effected using aluminum metal as a reductant.

14. The process as recited in claim 3, wherein step (d) involves the electrodeposition of antimony and arsenic as an arsenic-antimony alloy.

15. The process as recited in claim 3, further comprising refining the recovered antimony product to high purity antimony metal.

16. The process as recited in claim 3, further comprising converting the arsenic product to high purity arsenic metal, $As_2O_3$ or $AsCl_3$.

* * * * *

UNITED STATES PATENT AND TRADEMARK OFFICE
CERTIFICATE OF CORRECTION

PATENT NO. : 4,722,774

DATED : February 2, 1988

INVENTOR(S) : David E. Hyatt

It is certified that error appears in the above-identified patent and that said Letters Patent is hereby corrected as shown below:

IN THE TITLE:

Delete "OR" and insert --OF--.

IN THE SPECIFICATION:

Col. 3, line 41, delete "neither" and insert --Neither--.
Col. 9, line 45, delete "isposal" and insert --disposal--.

IN THE CLAIMS:

Claim 4, line 4, after "$SbCl_3$" insert --$AsCl_3$--.
Claim 6, line 1, delete "3" and insert --4--.
Claim 7, line 1, delete "3" and insert --4--.
Claim 8, line 1, delete "3" and insert --4--.
Claim 14, line 1, delete "3" and insert --4--.
Claim 15, line 1, delete "3" and insert --4--.
Claim 16, line 1, delete "3" and insert --4--.

Signed and Sealed this

Twelfth Day of July, 1988

Attest:

DONALD J. QUIGG

Attesting Officer    Commissioner of Patents and Trademarks